United States Patent Office 3,832,374
Patented Aug. 27, 1974

3,832,374
NOVEL ARYLTHIOCARBAMATE
Horst Liebig, Wunstorf, and Gunter Dransch, Eschborn, Germany, assignors to Riedel-De Haen Aktiengesellschaft, Seelze, Germany
No Drawing. Filed Aug. 17, 1971, Ser. No. 172,584
Claims priority, application Germany, Aug. 20, 1970, P 20 41 391.6
Int. Cl. C07c 155/02, 155/08
U.S. Cl. 260—455 A     1 Claim

ABSTRACT OF THE DISCLOSURE

4 - Acetyl-phenyl-N-methyl-N-3-tolyl-thiocarbamate can be used in fungicides and in cosmetics and may be prepared by reacting N-methyl-N-3-tolyl-thiocarbamoyl chloride with 4-hydroxyacetophenone or by reacting 4-acetyl-phenyloxy thiocarbonyl chloride with N-methyl-3-toluidine.

---

The present invention relates to a novel arylthiocarbamate, 4-acetyl-phenyl-N-methyl-N-3-tolyl-thiocarbamate, which has the formula

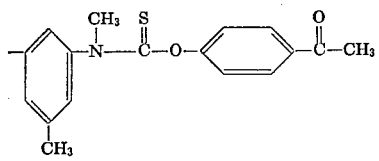

I

The present invention extends to cosmetics for the correction of scaliness and to fungicides for the control of microbiological fungi containing the compound together with a diluent or carrier, as well as to methods for the production of the compound.

The compound of the invention may be prepared by reacting N-methyl-N-3-tolyl-thiocarbamoyl chloride with 4-hydroxyacetophenone or by reacting 4-acetylphenyloxy thiocarbonyl chloride with N-methyl-3-toluidine.

The compound of the invention is highly effective against dermatomycoses, as well as fungi such as *Oidium tuckeri*, *Botrytis cinerea* and *Aspergillus niger*, so it may also be employed as large-scale fungicide in the field of plant protection. As to effectiveness, this compound is far superior to other monothiocarbamates such as are described in German Specifications 1,298,092 and 1,067,-425 and in U.S. Pat. 3,395,230 as well as to the commercial antimycotics which are effective on dermatopathogenic germs in dilutions ranging from 1:20 000 to 500 000.

In order to determine the fungicidal effect of the compound, successive dilutions were tested according to the teachings of I. F. Schamberg and I. A. Kolmer (Arch. dermatol. and syphilol. (Chicago) 6.746 (1922)).

The fungicide, dissolved in increasing dilutions of butylene glycol or a soap solution, was admixed in portions of 5 cc. each with 5 cc. of a double concentrated nutrient bouillon and inoculated by the addition of 1 drop of a 16-hour-old bouillon culture diluted in a ratio of 1:10. Evaluation was carried out after an incubation period of 72 hours.

Table 1 gives the inhibition concentrations down to which the growth of the fungi is completely inhibited.

TABLE 1

| Test compound | Number | Trichophyton mentagrophytes | Epidermophyton Kaufmann-Wolf | Microsporum gypseum |
|---|---|---|---|---|
| (Compound of the present invention) | 1 | 1:20,000,000 | 1:20,000,000 | 1:2,000,000 |
| German specification No. 1,298,092 | 2 | 1:2,000,000 | 1:2,000,000 | |
| | 3 | 1:500 | | |
| | 4 | 1:2000 | | |
| (known) | 5 | 1:50000 | | |

The test compound No. 2, i.e. the 2-naphthyl-N-methyl-N-3-tolyl-thiocarbamate, is described in German Specification No. 1,298,092 and known under the international nonproprietary name Tolnaftat or Naphthiomate T. The test compounds Nos. 3 to 4 are further monothiocarbamates having similar structures but, as shown in Table 1, no appreciable fungicidal effectiveness. The test compound No. 5 is known under the international non-proprietary name Hexachlorophen.

The compound No. 1 of the present invention is far superior to the other test compounds and is ten times more effective on Trichophyton mentagrophytes and on Epidermophyton Kaufmann-Wolf than the best of the other test compounds compared with it, i.e. compound No. 2. The results were substantiated by a suspension test showing the relationship between the time within which the microorganisms were killed and the concentration of the fungicide. The test was carried out according to "Richtlinien für die Prüfung chemischer Desinfektionsmittel," published by the Deutsche Gesellschaft für Hygiene und Mikrobiologie, Gustav Fischer Verlag Stuttgart, 1959, pages 2–3. According to these instructions the solutions of the test compounds Nos. 1 or 2 which were employed in graded concentrations were inoculated with the test microorganisms and after a certain exposure time were introduced into culture media.

In order to determine the protein factor, the same test was carried out with the addition of Boviserin instead of human serum. The concentrations and exposure times necessary for killing the microorganisms are given in Table 2 in percent by weight and minutes, respectively. For comparison purposes, an aqueous phenol solution of 1% was tested simultaneously.

TABLE 2

| Concentration | Test solution without additive | | Test solution plus 20% Boviserin | | Test solution plus 20% human serum | |
|---|---|---|---|---|---|---|
| | No. 2 | No. 1 | No. 2 | No. 1 | No. 2 | No.1 |
| A: | | | | | | |
| 0.05% | 2.5 | | 2.5 | | 2.5 | |
| 0.02% | 60 | | 60 | | 2.5 | |
| 0.01% | | 2.5 | | 2.5 | | 2.5 |
| 0.005% | | 2.5 | | 2.5 | | 2.5 |
| 0.002% | | 2.5 | | 2.5 | | 2.5 |
| 0.001% | | 60 | | 30 | | 5.0 |
| 0.0005% | | | | | | |
| Phenol 1% | 15 | | 15 | | 15 | |
| B: | | | | | | |
| 0.05% | 2.5 | | 2.5 | | 2.5 | |
| 0.02% | 60 | | 15 | | 60 | |
| 0.01% | | 2.5 | 60 | 2.5 | | 2.5 |
| 0.005% | | 2.5 | | 2.5 | | 2.5 |
| 0.002% | | | | | | |
| 0.001% | | | | | | |
| Phenol 1% | 60 | | 60 | | 60 | |
| C: | | | | | | |
| 0.5% | 2.5 | | 2.5 | | 2.5 | |
| 0.2% | 2.5 | | 2.5 | | 5.0 | |
| 0.1% | | | | | | |
| 0.05% | | | | | | |
| 0.02% | | 2.5 | | 2.5 | | 2.5 |
| 0.01% | | 30 | | 30 | | 2.5 |
| 0.005% | | | | | | |
| 0.002% | | | | | | |
| Phenol 1% | 30 | | 30 | | 60 | |

NOTE.—A = *Trichophyton mentagrophytes*; B = Epidermophyton Kaufmann-Wolf; C = *Microsporum gypseum*; test compound No. 1 = 4-acetylphenyl-N-methyl-N-3-tolylthiocarbamate; test compound No. 2 = 2-naphthyl-N-methyl-N-3-tolylthiocarbamate.

The suspension test also showed the superiority of the compound of the present invention. Thus, the compound of the invention (test compound No. 1) was, on average, ten times more effective—inclusive of the tests using *Microsporum gypseum*—than the test compound No. 2. For instance, the killing of *Trichopyton mentagrophytes* required, in the case of an exposure time of 2.5 minutes, a concentration of 0.002% if the test compound No. 1 is employed and a concentration of 0.05% if the test compound No. 2 is employed.

Furthermore, it became obvious that the compound of the invention had no protein factor.

The compound of the present invention, namely 4-acetylphenyl-N-methyl-N-3-tolyl-thiocarbamate is excellently suited for the control of microbiological fungi and may be employed either alone or in admixture with other fungicides and/or bactericides. The compound of the present invention may be further used in cosmetics which are for instance suited to correct scaliness of the scalp.

Whilst the compound according to the present invention may be used per se as a fungicide, it is, however, advisable to employ as fungicide or cosmetic a composition comprising a diluent or carrier in which the compound of formula I is present in a diluted form. Such fungicides or cosmetics may be put up, for instance, as ointments, creams, lotions, tinctures and powders. The concentration of the active ingredient 4-acetylphenyl-N-methyl-N-3-tolyl-thiocarbamate in such formulations may range from 0.01 to 10 percent by weight. Apart from this active ingredient, the fungicides or cosmetics may contain, by way of example, any of the following ingredients: talcum, starch or starch derivatives, glycerin, monosterate, isopropylmyristate, lanolin, paraffin, petroleum jelly, stearic acid, water, dimethylsulfoxide, alcohols, in particular cetylstearyl alcohol, polyethylene glycol, propylene glycol, emulsion auxiliaries, for example sodium laurylsulfonate, and preserving agents, such as para-hydroxybenzoate.

Within the frame of the present invention, the term "fungicide" is to be understood as comprising any agent controlling microbiological fungi such as humanopathogenic or phytoparasitic fungi.

The following examples are illustrative of the preparation of the compound according to the present invention. All temperatures are given in degrees centigrade.

Example 1

A solution consisting of 20 g. N-methyl-N-3-tolyl-thiocarbamoyl chloride and 13.6 g. of 4-hydroxyacetophenone in 300 cc. acetone were carefully admixed, at a temperature of 10–50°, with 4 g. sodium hydroxide in 46 g. water and stirred until the reaction mixture becomes neutral. Subsequently, after having cooled, the solution was poured into iced water which was then stirred until crystals formed, these latter being filtered off and recrystallized from ethanol. 26 g. (87% of the theoretical) of 4-acetylphenyl-N-methyl-N-3-tolyl-thiocarbamate was obtained in the form of colourless crystals melting at 93°.

Analysis data of the product, $C_{17}H_{17}NO_2S$: Calculated: N, 4.68; S, 10.7. Found: N, 4.7; S, 10.9.

The known compound 4-hydroxy-acetophenone utilized as starting material may be prepared, for example, by a Fries-type reaction using phenyl acetate or by acylation of phenol according to the method described by Friedel-Crafts, using zinc chloride as catalyst (see Eijkman, Bergema and Henrard, C 1905 I, 817 (Chemisch Weekblad 2, 59–72 and 79–93)).

N-methyl-N-3-tolyl carbamoyl chloride may, for example, be prepared by reacting N-methyl-3-toluidine and thiophosgene in anhydrous ether. The thiophosgene and the N-methyl-3-toluidine are employed in a molar ratio of 1:2. N-methyl-meta-toluidine hydrochloride, formed as a by-product, is filtered off. From the remaining etheric solution N-methyl-N-3-tolyl thiocarbamoyl chloride can be obtained by distillation in the form of a light yellow oil having a boiling point of 155° at 8 mm./Hg.

Example 2

24.3 g. N-methyl-3-toluidine were slowly added, dropwise with stirring, at temperatures ranging from 0° to 40°, to a solution consisting of 21.5 g. 4-acetylphenoxy thiocarbonyl chloride in 300 cc. acetone. In order to complete the reaction, stirring was continued for 1 hour, then the reaction mixture was cooled, filtered off from the N-methyl-3-toluidine hydrochloride formed and poured into iced water. The 4-acetylphenyl-N-methyl-N-3-tolyl-thiocarbamate was recrystallized from ethanol. Yield: 25 g. (83% of the theoretical) melting point: 93°.

The 4-acetylphenoxy thiocarbonyl chloride required as starting material was prepared by adding 1 mol of 4-hydroxy-acetophenone, dissolved in a 5% aqueous sodium hydroxide solution, dropwise while stirring and cooling with ice to a solution consisting of 1 mol thiophosgene in five times the amount of chloroform. On completion of the addition, the chloroform layer was separated, washed with water, dried, evaporated to dryness and the residue was recrystallized from petroleum ether. 4-acetylphenoxy-thiocarbonyl chloride was obtained in the form of light yellow crystals melting at 54–55°.

What we claim is:
1. 4-acetylphenyl-N-methyl-N-3-tolyl-thiocarbamate.

References Cited

UNITED STATES PATENTS

| | | | |
|---|---|---|---|
| 3,224,862 | 12/1965 | Weiss | 260—455 A |
| 3,224,864 | 12/1965 | Hamm et al. | 260—455 A |

FOREIGN PATENTS

| | | | |
|---|---|---|---|
| 1,067,425 | 10/1959 | Germany | 260—455 A |
| 1,298,092 | 6/1962 | Germany | 260—455 A |
| 1,140,924 | 12/1962 | Germany | 260—455 A |

OTHER REFERENCES

Chem. Abstracts, Vol. 69, 1968, 76987x.

LEWIS GOTTS, Primary Examiner

D. R. PHILLIPS, Assistant Examiner

U.S. Cl. X.R.

260—543 R; 424—Digest 4, 69, 300